April 1, 1958 H. W. IVEY 2,828,970
TRACTOR SAFETY CRADLE
Filed Jan. 28, 1957
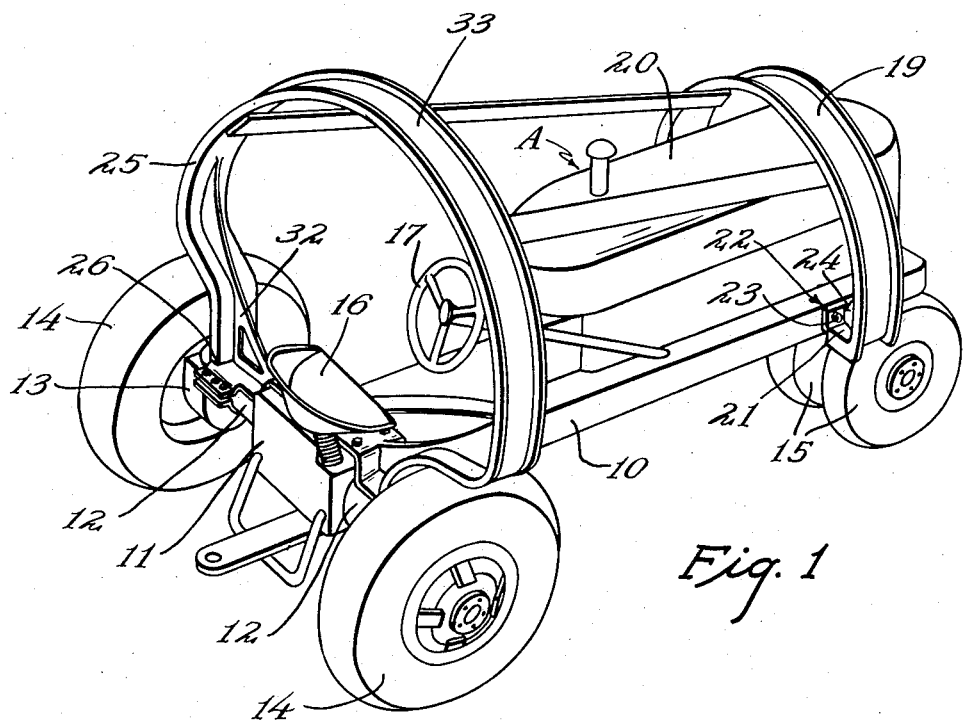
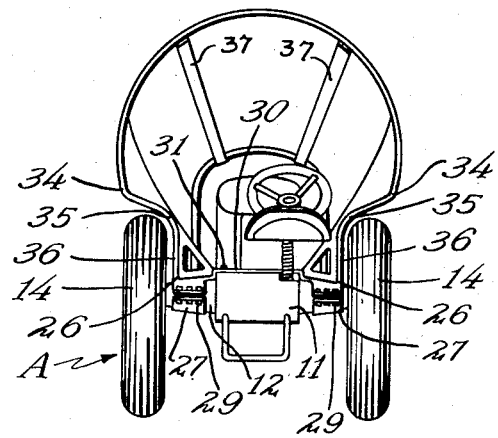
INVENTOR
Henry W. Ivey
BY Robert M. Dunning
ATTORNEY

2,828,970

TRACTOR SAFETY CRADLE

Henry W. Ivey, St. Paul, Minn.

Continuation of application Serial No. 433,129, May 28, 1954. This application January 28, 1957, Serial No. 636,813

5 Claims. (Cl. 280—150)

This invention relates to an improvement in tractor safety cradles and deals particularly with a frame mounted upon a tractor to prevent injury to the operator or the tractor in the event the tractor tips over.

Many fatal accidents have been caused by tractors tipping over while in use. The driver often becomes pinned beneath the tractor as it tips over and is seriously or fatally injured. The present invention is designed to eliminate this difficulty.

Various types of frames have been mounted upon automotive vehicles for the purpose of protecting the driver in the event the vehicle tips over. While certain of these previous structures are capable of accomplishing a desirable result, they fail to properly protect the vehicle. The wheels of the vehicle usually project laterally beyond the protective frame and as a result the tilting of the tractor has a tendency to break the axle or the wheel. This is particularly true in conjunction with tractors where the wheels are of substantial size.

An object of the present invention resides in the provision of a safety frame secured to a tractor and which extends substantially flush with, or somewhat beyond the outer surface of the rear wheels. As a result, when the tractor tilts upon its side the strain is placed upon the protective frame as well as upon the wheel, thereby eliminating the chance of injury to the tractor. As the frame extends over the driver, the driver is protected from injury if he is held to the seat. If desired, a safety belt may be employed for holding the driver in place during the tilting of the tractor.

A further feature of the present invention resides in the provision of a pair of frame members on a tractor, one of which is located near the rear of the tractor and the other of which is located near the front thereof. The frame member at the rear of the tractor extends upwardly from the body of the tractor inwardly of the wheels and then curves outwardly to a position flush with or slightly beyond the wheels. From this point the frame loops upwardly over the driver's seat. The forward frame member is also generally U-shaped in cross section with the ends of the U-shaped frame extending inwardly, there being anchored to the frame. This generally U-shaped forward frame member curves over the engine of the tractor so as to protect the same in the event the tractor tips over and to permit the tractor to roll entirely over if necessary.

A further feature of the present invention lies in the fact that my frame members have a tendency to permit the tractor to roll entirely over once it tilts upon its side. In other words, the frame members permit the rolling action to continue until the tractor is substantially inverted, whereupon it can either continue the rolling action until it is again upright or can roll back into upright position. The center of gravity of the tractor is preferably sufficiently low to permit the tractor to always tend to return to upright position.

These and other objects and novel features of my invention will be more clearly and fully set forth in the following specification and claims.

In the drawings forming a part of the specification:

Figure 1 is a perspective view of a tractor with my safety cradle attached thereto.

Figure 2 is a rear elevational view diagrammatically illustrating the arrangement of the frames on the tractor.

This application is a continuation of my previously filed application, Serial No. 433,129, filed May 28, 1954, now abandoned.

In the present arrangement the safety cradle is shown only diagrammatically. It will be understood that the specific manner of attaching the cradle to the tractor may vary with tractors of different types and the drawing is intended merely to show the principle involved. In actual practice, braces are normally applied to hold the frame members in proper relation and in some instances the two frame members are connected by connecting braces.

The tractor is illustrated in general by the letter A and is shown as having an elongated frame 10 having at its rear end a differential housing 11 from which projects oppositely disposed axle housings 12. These axle housings support gear boxes 13 at their outer ends which transmit power from the axles to the rear wheels 14. As is usual in such devices, the rear wheels 14 are of considerable size so as to provide a firm bearing upon soft ground.

A pair of wheels 15 are pivotally supported upon a suitable support not illustrated in the drawings, the support normally being pivotal about a vertical axis so that the tractor may be steered. The tractor is also provided with the conventional seat 16 located above the differential housing 11 and a steering wheel 17 of any suitable type by means of which the tractor may be manipulated.

As is illustrated in Figure 1 of the drawings, an inverted generally U-shaped frame 19 extends over the engine cover 20 in spaced relation thereto. This frame member 19 is of heavy material capable of withstanding a very substantial strain and the frame is preferably channel shaped or angular in cross section for strength. The lower ends of the frame 19 extend inwardly as indicated at 21, these ends being opposed and being secured to the frame 10 by any suitable means. The shape of the frame member is such as to make the tractor unstable when tilted beyond ninety degrees so as to increase the tendency for the tractor to roll back into upright position.

As shown in Figure 1, braces 22 project laterally from the frame 10. These braces include mounting plates 23 bolted to the frame sides of the frame 10 and also include gusset plates 24 extending from the plates 23 to the inner surface of the frame 19. This reinforces the frame 19 so that in the event the tractor falls upon its side, the frame will absorb the major portion of the strain.

A second frame member 25 extends upwardly from the tractor and is shown as having a yoke 26 at its lower end on each side of center which fits over a corresponding axle housing 12 and is shaped to fit the contour thereof. A cooperable yoke 27 underlies each axle housing 12 and is secured to the yoke 23 by bolts 29 or other suitable means. In other words, the lower ends of the frame 25 are firmly anchored to the axle housing. A cross frame member 30 connects the yoke 26 on opposite sides of the tractor frame. This cross member 30 is shown extending over the transmission housing 11 and is secured thereto by suitable means such as bolts 31.

As tractors of various types require mountings of different types, the structure shown is more or less exemplary of a type of construction found suitable for one type of tractor construction. It will also be noted that a strengthening rib or gusset 32 extends over the cross frame member 26 and upwardly along the frame sides.

The frame member 22 is preferably channel shaped in cross section for the purpose of increasing the strength of the device.

From the drawings it will be noted that the frame 25 includes a rounded upper portion 33 which is slightly wider at its lower end than the distance between the outer surfaces of the wheels 14. The lower ends of the curved portion 33 are bent inwardly as indicated at 34 and then the frame ends are reversely curved as indicated at 35 to overlie the upper surfaces of the wheels 14. The frame terminates in generally parallel portions 36 which are anchored to the axle housings in the manner as described.

By having the curved portion of the frame extend upwardly and outwardly over the rear wheels 14, an arrangement is provided which acts to protect the wheels as well as the remainder of the tractor in the event the tractor tips over. When the tractor falls upon its side, a portion of the strain is absorbed by the portions of the frame 25 just above the points of bend 34. Thus, the force tending to break the rear axle or the wheel is considerably lessened. The gusset plates extend above these frame portions 34 so as to strengthen the frame where the greatest strain is experienced.

Furthermore, as the tractor continues to roll, it may roll completely over if the rolling tendency is sufficient. A lesser force will permit the tractor to roll toward inverted position until the rolling force is dissipated whereupon the tractor will then tend to roll in a reverse direction until the tractor is on its side or it is right side up.

Angularly spaced braces 37 connect the frames 19 and 25, equalizing the strain and further protecting the tractor. These braces are arranged to provide a minimum of obstruction to the vision of the driver while still adding materially to the strength of the frames.

By use of conventional safety belts or the like, the tractor operator may be held in his seat as the tractor rolls over, preventing injury. The tractor is preferably provided with an automatic circuit breaking ignition switch so that the current to the motor will stop in the event the tractor tips over. Thus, the tractor engine will not continue to run when in a tilted position.

It is important to know that the radius of curvature of the rear frame member is considerably greater than the radius of curvature of the forward frame member so that in the event the tractor is subjected to a force which tends to roll it over several times, the tractor will tend to roll in a generally circular path. Thus, the tractor will be maintained in a relatively small area.

In accordance with the patent statutes, I have described the principles of construction and operation of my tractor safety cradles, and while I have endeavored to set forth the best embodiments thereof, I desire to have it understood that obvious changes may be made within the scope of the following claims without departing from the spirit of my invention.

I claim:

1. In combination, a tractor having an elongated body including a seat supported thereon and a motor drive supported by relatively large rear wheels and relatively smaller front wheels mounted to the said body and a protective cradle mounted thereover, said cradle including a first large channel shaped frame portion secured to the tractor body inwardly of the rear wheels and extending upwardly, inwardly of the rear wheels and curving outwardly over the rear wheels to a point substantially flush with the outer surface thereof and thence being curved continuously upwardly and inwardly at the top portion to extend in spaced curved relationship about the sides and over said seat, a second smaller channel-shaped frame portion secured to and extending over the tractor body in a curved relationship thereto, said second frame portion extending outwardly from said tractor body near the said smaller front wheels and curved upwardly and inwardly in spaced relationship to said body and said front wheels, gusset means connected to the said outward, upward and inward curvatures of said first and second channel shaped frame portions, and angularly spaced braces connecting the said frame portions over the said tractor body adjacent the top curvatures thereof, whereby said gussets strengthen the frame portions at and above said curvatures and said cradle allows the tractor to roll completely over with said braces additionally protecting the tractor and equalizing the strain on the connected outermost curvatures of said frame portions.

2. The structure of claim 1, wherein said second frame portion extends outwardly in a plane substantially parallel to the plane of the elongated body of the tractor to a point beyond the plane of the mounting for the said smaller front wheels, said first frame portion including a cross frame member extending across said tractor body adjacent the support for the said seat, said cross frame member connecting the ends of said first frame portion, and securing means attaching said cross member to said tractor body.

3. A safety cradle for a tractor having a chassis supported by relatively large diameter rear wheels and relatively smaller diameter front wheels, and including a seat substantially between said rear wheels, the cradle including a member having a rounded top portion above the seat extending downwardly on opposite sides of the tractor to points directly above, closely adjacent, and substantially flush with, the outer surfaces of the rear wheels, the sides of said member then extending inwardly over the rear wheels and downwardly inwardly of the rear wheels and attached to said chassis on opposite sides of said seat, said frame forming a guard engageable with the ground in the event the tractor tips upon its side, preventing the rear wheels from being bent inwardly at their upper ends, and forming a continuously rounded surface above said rear wheels, said guard extending above the level of a person sitting on said seat.

4. The structure of claim 3 and including a second frame secured to said chassis near the forward end thereof and having portions extending laterally outwardly therefrom, and including a continuously curved portion connected to said laterally extending portions of said second frame extending over the forward part of the tractor in substantially parallel relation to said member.

5. A safety cradle for a tractor having a chassis supported by relatively large diameter rear wheels and relatively smaller diameter front wheels, and including a seat substantially between said rear wheels, the cradle including a member having a rounded top portion above the seat extending downwardly on opposite sides of the tractor to points directly above, closely adjacent, and substantially flush with, the outer surfaces of the rear wheels, the sides of said member extending over the rear wheels and secured to said chassis, said frame forming a guard engageable with the ground in the event the tractor tips upon its side, preventing the rear wheels from being bent inwardly at their upper ends, and forming a continuously rounded surface above said rear wheels, said guard extending above the level of a person sitting on said seat.

References Cited in the file of this patent

UNITED STATES PATENTS

| | | |
|---|---|---|
| 1,247,674 | Hankinson | Nov. 27, 1917 |
| 2,729,462 | Maybrier | Jan. 3, 1956 |
| 2,783,056 | Belk | Feb. 26, 1957 |